United States Patent [19]

Michelangeli et al.

[11] Patent Number: 4,796,262

[45] Date of Patent: Jan. 3, 1989

[54] OPTICAL RESONATOR USING A PASSIVE Q SWITCH OR OTHER OPTICAL ELEMENT WITH LOW-DAMAGE THRESHOLD

[75] Inventors: Glauco B. Michelangeli; Michele De Maria; Giampiero Giuliani, all of Rome, Italy

[73] Assignee: Selenia Industrie Elettroniche Associate SpA, Rome, Italy

[21] Appl. No.: 840,421

[22] Filed: Mar. 17, 1986

[30] Foreign Application Priority Data

Mar. 18, 1985 [IT] Italy ............................ 47824 A/85

[51] Int. Cl.⁴ .............................................. H01S 3/10
[52] U.S. Cl. ........................................ 372/9; 372/11;
372/106; 372/98
[58] Field of Search .................. 372/12, 26, 88, 105,
372/106, 11, 107, 98

[56] References Cited

U.S. PATENT DOCUMENTS

| | | | |
|---|---|---|---|
| 3,914,710 | 10/1975 | Young | 372/105 |
| 3,928,818 | 12/1975 | White | 372/105 |
| 4,191,931 | 3/1980 | Kuppenheimer | 372/11 |
| 4,197,513 | 4/1980 | Bell et al. | 378/12 |
| 4,546,477 | 10/1985 | Richards | 378/12 |
| 4,559,627 | 12/1985 | Chun | 372/99 |

FOREIGN PATENT DOCUMENTS 2913270 10/1980 Fed. Rep. of Germany ........ 378/26

OTHER PUBLICATIONS

Johnson et al; "Plastic Q-Switch for Giant Pulse Lasers"; *IBM Technical Disclosure Bull.* vol. 15, No. 8, Jan. 1973.
Kirk; "High-Repetition Rate Plastic Dye Q-Switch"; *IBM Tech. Discl. Bull.* vol. 16, No. 6, Nov. 1973.

*Primary Examiner*—Leon Scott, Jr.
*Attorney, Agent, or Firm*—Herbert Dubno

[57] ABSTRACT

An optical resonator for a power laser comprises between one of a pair of totally reflecting mirrors flanking the end of a pumped active element such as a Nd:YAG crystal, a passive Q switch and between the passive Q switch and the active element, a polarizer which reflects the output transversely to the optical axis of the reflecting beams of the cavity. A phase shifter is provided between the polarizer and the approximal end of the active element. This system prevents the full output energy from impinging upon the passive Q switch so that the passive Q switch or other low-damage-threshold optical elements associated therewith do not have to take the full power.

5 Claims, 1 Drawing Sheet

OPTICAL RESONATOR USING A PASSIVE Q SWITCH OR OTHER OPTICAL ELEMENT WITH LOW-DAMAGE THRESHOLD

FIELD OF THE INVENTION

Our present invention relates to an optical resonator and, more particularly, to an optical resonator for a power laser.

BACKGROUND OF THE INVENTION

As will be described in great detail below with respect to an illustrated prior-art power laser configuration, a power laser generally comprises an active element, i.e. the laser crystal itself, which is generally elongated and can be pumped in a conventional manner to generate a laser beam.

This beam is reflected between a pair of mirrors which are disposed at opposite ends of the laser crystal along the optical axis thereof and it is known to provide a passive Q switch in such systems between the output mirror and one end of the active element. The amplified light, i.e. the power laser output, emerges through the mirror at this end of the active element which is semireflecting.

The losses in such systems are high and, especially because of the presence of the passive Q switch which may not have negligible losses, it is desirable to minimize such losses.

Furthermore, the passive Q switch and other optical elements which may be used in such power laser applications have relatively low-damage thresholds and thus a tendency to be damaged by the output beam when traversed by the full intensity of the latter.

OBJECTS OF THE INVENTION

It is, therefore, the principal object of our present invention to provide an optical resonator for a power laser using a passive Q switch or any other optical element which has a low damage threshold, whereby the aforementioned drawbacks can be obviated.

Another object of this invention is to provide an optical resonator which overcomes the disadvantages of the prior art.

SUMMARY OF THE INVENTION

These objects and others which will become apparent hereinafter are attained, in an optical resonator for a power laser which comprises the active means, i.e. the laser crystal previously mentioned, two totally reflecting cavity mirrors juxtaposed with opposite ends of the cavity, and a passive optical switch assembly between one of these mirrors and the active element.

The assembly can include a phase shifter, a polarizer and a passive Q switch or other optical element with a low damage threshold and preferably with a threshold response at a laser emission optical frequency of the cavity resulting from the two mirrors and the active element, but with a saturation intensity enabling the passive switch to saturate by the beams of light emitted by the active element.

According to the invention, the passive Q switch is placed between the polarizer and one of the two cavity mirrors while the active beams and the phase shifter are disposed between the polarizer and the other cavity mirror.

This configuration reduces the losses introduced by the passive Q switch and also reduces the risk of damage to the passive Q switch by radiation.

More particularly, the invention comprises:

an elongate pumped light-amplification active element adapted to receive and emit beams of light at opposite ends of the element;

a respective totally reflecting mirror juxtaposed with each of the ends to form a power-laser cavity with the light-amplification active element; and a passive optical switch assembly between one of the mirrors and the light-amplification active element, the passive optical switch assembly comprising:

a phase shifter proximal to the light-amplification active element, a low-damage threshold passive switch having a threshold response at a laser emission optical frequency of the cavity and a saturation intensity enabling the passive switch to saturate by the beams of light, and a polarizer between the phase shifter and the passive switch and inclined to an optical axis of the light-amplification active element and the mirrors for outputting a high power laser beam generally transversely to the axis.

While, in the preferred embodiment, the passive switch is a passive Q switch as mentioned, capable of storing optical energy from the active element over a substantial time period to saturation and then releasing the stored energy in a brief laser pulse over a short duration, this passive Q switch can be coupled to another low-damage-threshold optical element or can be replaced or substituted by an optical element other than a passive Q switch having a low damage threshold.

More particularly, the power laser optical resonator of the invention uses a passive Q switch (PQS) and/or any low-damage-threshold optical element or optical element with non-negligible losses.

A passive Q switch is a device which generates a short laser pulse of energy which has been stored over a much longer period in the form of incident energy from the active means or element.

A PQS can be formed by a substance within the laser cavity which has an absorption peak and a laser emission optical frequency. Such absorption must have a suitable saturation intensity.

With the invention, power losses are markedly reduced and the probability of damage to the optical elements which, vital to laser operation, have a low damage threshold and/or low radiation transmission losses is likewise reduced or minimized.

BRIEF DESCRIPTION OF THE DRAWING

The above and other objects, features, and advantages of the present invention will become more readily apparent from the following description, reference being made to the accompanying drawing in which.

SPECIFIC DESCRIPTION

Figure 2:
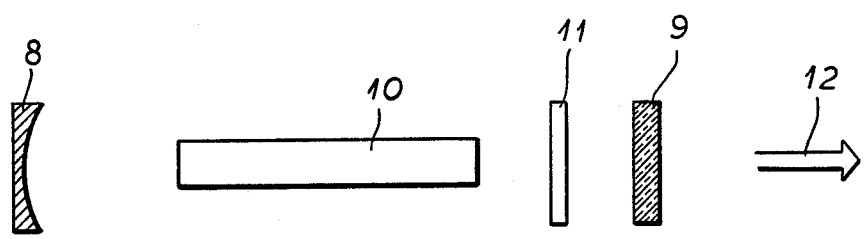
FIG. 2 is a similar diagram of a power laser optical cavity representing a conventional or prior art approach.

Referring first to FIG. 2, it can be seen that a resonant cavity for a power laser has, in the past, generally comprised a pumped active laser element represented generally at 10 which is elongated and has its ends juxtaposed with a pair of mirrors, namely, the totally reflecting concave mirror 8 and the semi-reflecting planar mirror 9. The PQS is here represented at 11 and is disposed between the mirror 9 and the active element 10.

The highly amplified power laser output beam is shown at 12, having been emitted through the mirror 9.

It will be apparent that the full power of this beam has therefore traversed the PQS 11 and has sustained losses in transmission through the PQS or has been compelled to have been of reduced intensity to avoid damage to the low-damage-threshold PQS 11.

Figure 1:
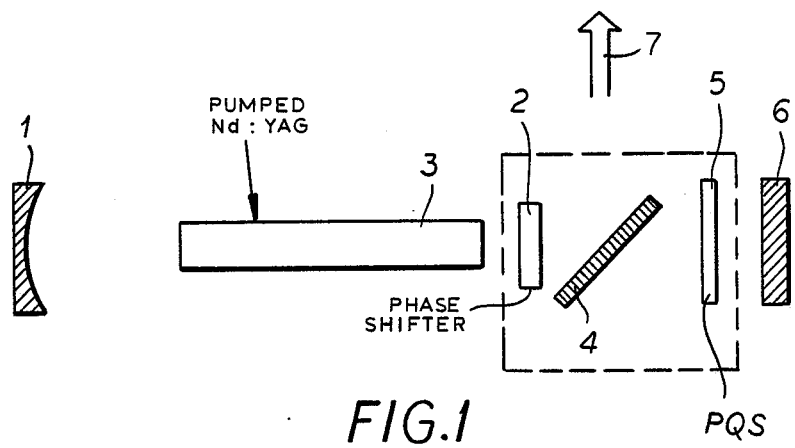
FIG. 1 is a diagram of an optical cavity provided with a passive optical switch assembly in accordance with the present invention.

In the embodiment of the invention represented equally diagrammatically in FIG. 1, the cavity mirrors 1 and 6 which flank the active element 3 are totally reflecting.

The active element 3 is a pumped optical amplifier or laser generator.

According to the invention, a phase shifter 2 is provided between one end of the active element 3 and the totally reflecting mirror 6, the phase shifter 2 being of a conventional design. The phase shifter modifies the polarization distribution of the electromagnetic field circulating in the cavity.

Between this phase shifter 2 and the totally reflecting mirror 6 is a polarizer 4 which is inclined to the optical axis of the active element 3 and the cavity mirrors 1 and 6 and deviates the output radiation. As a consequence, the main power beam from the mirror is directed perpendicularly to this optical axis as shown at 7. Between the polarizer 4 and the totally reflecting mirror 6 is a passive Q switch utilizing a saturable absorber in the manner described.

According to the best mode embodiment of the invention, the two totally reflecting mirrors 1 and 6, of which mirror 1 is concave, are of the dielectric layer type known in optical resonating cavities for power lasers.

The phase shifter 2 comprises a $\lambda/4$ crystal quartz lamination with anti-reflection coated faces for $\lambda = 1.06\mu$.

The active means 3 can consist, in the best mode embodiment of the invention, of a Nd doped YAG rod with anti-reflection treated surfaces, i.e. an Nd: YAG laser.

The passive Q switch 5 consists of a plastic, doped with an organic saturatable absorption dye and cemented between two optically treated glass windows having anti-reflection treated surfaces.

The polarizer 4 is an optically shaped glass film which has one of its two surfaces, namely, the surface facing the phase shifter 2, formed with polarizing dielectric layers.

The polarized light radiation coming from mirror 6 crosses the PQS 5 with a transmission coefficient determined by the PQS optical characteristics and thereafter, with negligible loss, traverse polarizer 4 and then impinges upon the phase shifter 2.

The light radiation, after traversing the phase shifter 2 is amplified in the pumped laser 3, the beams being reflected by the mirror 1 and again amplified by the active means 3 to traverse the phase shifter 2 again with an amplification coefficient which depends upon the pumping characteristics of the crystal 3 and with a polarization distribution which depends upon the orientation of the phase shifter 2 and its optical power.

From the configuration illustrated, therefore, the radiation intensity seen by the PQS 5 can be held below its damage threshold independently of the usable output intensity emitted in the form of the beam 7.

A Q switch laser can be provided, therefore, with average to high repetition rates, in a compact configuration and in a highly reliable form.

Damage probability decreases with this configuration and the transmission losses are likewise minimized, especially because the damage sensitive elements are positioned between the polarizer 4 and the totally reflecting mirror 6. In fact, the beam intensity in this part of the optical resonator may be much lower than that at the output 7.

We claim:

1. An optical resonator for a power laser, comprising:
   a elongate pumped laser crystal adapted to receive and emit beams of light at opposite ends of said element;
   a respective totally reflecting mirror juxtaposed with each of said ends to form a power-laser cavity with said laser crystal; and a phase shifter disposed between one of the mirrors and the respective end of said laser crystal;
   a passive optical switch assembly between said one of said mirrors and said laser crystal, said passive optical switch assembly consisting of:
   capable of storing optical energy from said element over a substantial time period to saturation and then releasing the stored energy in a brief laser pulse over a shorter duration, said passive Q-switch having a threshold response at a laser emission optical frequency of said cavity and a saturation intensity enabling said passive switch to saturate by said beams of light, and
   a polarizer between said phase shifter and said crystal and said mirrors for outputting a high power laser beam generally transversely to said axis and forming with said passive Q switch and said phase shifter an optical configuration that reduces radiation between the polarizer and said one mirror thereby reducing damage to the passive Q switch by reducing losses introduced by the Q switch in the path between said laser and said one of said mirrors to thereby increase the total efficiency of the resonator.

2. The optical resonator defined in claim 1 wherein said phase shifter consists of a $\lambda/4$ crystal quartz laminated with anti-reflection coated faces and $\lambda = 1.06\mu$.

3. The optical resonator defined in claim 2 wherein said passive Q switch consists of plastic, doped with an organic saturatable absorption dye, glued between two optically treated glass windows having anti-reflection treated surfaces.

4. The optical resonator defined in claim 3 wherein said polarizer consists of a glass film having a surface facing said phase shifter treated with polarizing dielectric layers.

5. The optical resonator defined in claim 4 wherein said element is Nd:YAG rod with anti-reflection treated surfaces.

* * * * *